US009606906B1

(12) United States Patent
Van Nostrand

(10) Patent No.: US 9,606,906 B1
(45) Date of Patent: Mar. 28, 2017

(54) METHOD FOR GENERATING TEST DATA FROM EXPECTED PRODUCT OUTPUT

(71) Applicant: GOOGLE INC., Mountain View, CA (US)

(72) Inventor: Elizabeth Emily Van Nostrand, Mountain View, CA (US)

(73) Assignee: GOOGLE INC., Mountain View, CA (US)

( * ) Notice: Subject to any disclaimer, the term of this patent is extended or adjusted under 35 U.S.C. 154(b) by 168 days.

(21) Appl. No.: 14/260,914

(22) Filed: Apr. 24, 2014

(51) Int. Cl.
*G06F 11/36* (2006.01)

(52) U.S. Cl.
CPC ...... *G06F 11/3692* (2013.01); *G06F 11/3684* (2013.01)

(58) Field of Classification Search
CPC ............ G06F 11/3692; G06F 11/3696; G06F 11/3684; G06F 11/3688
See application file for complete search history.

(56) References Cited

U.S. PATENT DOCUMENTS

| 2008/0086660 | A1* | 4/2008 | Wefers | G06F 11/3688 714/37 |
| 2008/0104577 | A1* | 5/2008 | Holden | G06F 11/3692 717/126 |
| 2009/0313606 | A1* | 12/2009 | Geppert | G06F 11/3692 717/124 |
| 2011/0035486 | A1* | 2/2011 | Seolas | G06F 11/362 709/224 |
| 2011/0145628 | A1* | 6/2011 | Wilson | G06F 11/3692 714/4.2 |
| 2013/0117609 | A1* | 5/2013 | Dande | G06F 11/3692 714/32 |
| 2013/0339933 | A1* | 12/2013 | Walters | G06F 8/70 717/131 |
| 2014/0201713 | A1* | 7/2014 | Boden | G06F 11/3692 717/124 |
| 2015/0261657 | A1* | 9/2015 | Kommineni | G06F 11/3676 714/38.1 |

* cited by examiner

*Primary Examiner* — Yolanda L Wilson
(74) *Attorney, Agent, or Firm* — Birch, Stewart, Kolasch & Birch, LLP

(57) ABSTRACT

A system and method for verifying the output of a system under test is disclosed. An example method begins with receiving a production output from a system under test. A verification data set may be generated from the production output. Then, the verification data set may be provided as input to the system under test. A verification output may be received from the system under test resulting from the system under test ingesting the provided verification data set. The production output and the verification output may be compared with each other to determine whether there are any inconsistencies in the outputs.

16 Claims, 5 Drawing Sheets

```
metrics: {                                      #
  (ads_branding_grp) size=120B
  cookie: {                                     #
  (ads_branding_grp.Counts) size=108B
    raw_impressions: 15
    raw_count        : 5
    impression_weighted_count   ..
5.0
    overall_cap: {                              #
    (ads_branding_grp.Histogram) size=2B
      b1 : 5
    }
    impressions_per_count: {                    #
    (ads_branding_grp.Histogram) size=4B
      b1 : 3
      b2 : 2
    }
    cookie_age_count: {                         #
    (ads_branding_grp.Histogram) size=2B
      b1 : 5
    }
    cookie_age_impressions: {                   #
    (ads_branding_grp.Histogram) size=2B
      b1 : 15
    }
  # time_of_day_impressions: {
    (ads_branding_grp.Histogram) size=2B
      b1 : 15
    }
  # impressions_at_cookie_age: {
    (ads_branding_grp.Histogram) size=2B
      b1 : 15
    }
  # day_of_week_impressions: {
    (ads_branding_grp.Histogram) size=2B
      b6 : 15
    }
  }
```

FIG. 2

```
1 : {                    # (ads_branding_grp.EventProto)
size=42B
    timestamp_usec       : 13749958431372626     # 1.22Pi;
[as microseconds]: 2013-07-28 00:17:23.137262 -
0700
    cookie_id            : 1
    cookie_birthtime_sec : 1374780294            #
1_374_780_294; 1.28Gi; [as seconds]: 2013-07-25
12:24:54 -0700
    attrs: {             #
(ads_branding_grp.EventAttributes) size=19B
        country_code: "US"
        ppd_calibrated_weight    : 0.2
        dfa_campaign: 7240535    # 7_240_535;
6.91Mi; [if milliseconds]: 2 hours 40 seconds
    }
}
2 : {                    # (ads_branding_grp.EventProto)
size=42B
    timestamp_usec       : 13749958431372626     # 1.22Pi;
[as microseconds]: 2013-07-28 00:17:23.137262 -
0700
    cookie_id            : 1
    cookie_birthtime_sec : 1374780294            #
1_374_780_294; 1.28Gi; [as seconds]: 2013-07-25
12:24:54 -0700
    attrs: {             #
(ads_branding_grp.EventAttributes) size=19B
        country_code: "US"
        ppd_calibrated_weight    : 0.2
        dfa_campaign: 7240535    # 7_240_535;
6.91Mi; [if milliseconds]: 2 hours 40 seconds
    }
}
```

FIG. 3

METHOD FOR GENERATING TEST DATA FROM EXPECTED PRODUCT OUTPUT

BACKGROUND

Many computer applications produce log files to record actions or events that occur as the applications execute. User events, function calls, system-level kernel calls, and file system calls are examples of application events that can be recorded in a log file.

Other computer applications may ingest these log files and use the log files to perform statistical analysis and generate metrics as output. For example, an application may produce logs of events from user interactions with websites which include advertisements. A second application or second process within the application may take these event logs and use them to produce metrics regarding advertising impressions such as a total number of impressions and unique cookie impressions in the given set of logs. Reports may be generated from these output metrics so it is important that the metrics are correct. However, it can be difficult to test the correctness of generated output metrics.

A conventional method for testing output may compare output from a new version of an application with output of a previous version of the application, given the same input. This testing method may catch regression bugs, but not existing bugs in the application. This method may also be impractical when a software developer has deliberately changed application behavior. Another testing method may hardcode input data and expected output. This method requires updating the tests when changes are made to the application, which is time consuming and can introduce bad data into tests. A different conventional testing method may require implementing features in test code and giving the same input to test and development implementations of the code and compare the output. This method may be useful when the production code is highly optimized, but there may not be a simple way to implement the same functionality. If there is no simple way to implement code functionality, this method may be costly to build and maintain, and hard to debug. An additional method may only check aspects of output that are easy to check, but this method may leave the most complicated part of an application's functionality untested.

SUMMARY

This specification describes technologies relating to testing applications in general, and specifically to methods for verifying the output of a system under test.

In general, one aspect of the subject matter described in this specification can be embodied in a system and method for verifying the output of a system under test. An example system includes one or more processing devices and one or more storage devices storing instructions that, when executed by the one or more processing devices, cause the one or more processing devices to execute an example method. An example method includes: receiving production output (or a description of production output) from the system under test; generating a verification data set from the production output; providing the verification data set as input to the system under test; receiving a verification output from the system under test resulting from the system under test ingesting the verification data set; and comparing the production output with the verification output to determine whether there are any inconsistencies.

These and other embodiments can optionally include one or more of the following features: production output and the verification output may include metrics; the verification data set may be in the form of a log file; additional information may be provided to the system under test in addition to the verification data set so that the system under test can produce verification output; additional information may be provided in the form of a file; additional information may be provided so that a file may be generated; the system under test may be a system for collecting advertisement impressions, a social network system that calculates usage and viewing statistics, an online store system that tracks purchases, a website application that monitors traffic, a sales software system that monitors salesperson success, or a scientific software system that monitors experiment outcomes; generating a verification data set may include receiving software code or a template that provides information about converting the production output into a verification data set; and generating a verification data set may include iterating through multiple aggregated trait assignments and parsing traits and attributes from the trait assignments to create verification data set entries.

The details of one or more embodiments of the invention are set forth in the accompanying drawings which are given by way of illustration only, and the description below. Other features, aspects, and advantages of the invention will become apparent from the description, the drawings, and the claims. Like reference numbers and designations in the various drawings indicate like elements.

BRIEF DESCRIPTION OF THE DRAWINGS

FIG. 2 is an example original output file from a system under test.

FIG. 3 is an example log file from an example log generator process.

DETAILED DESCRIPTION

As recognized by the inventor, there should be a way to verify that the output of a system is the expected output of the system given a specific input.

Figure 1:
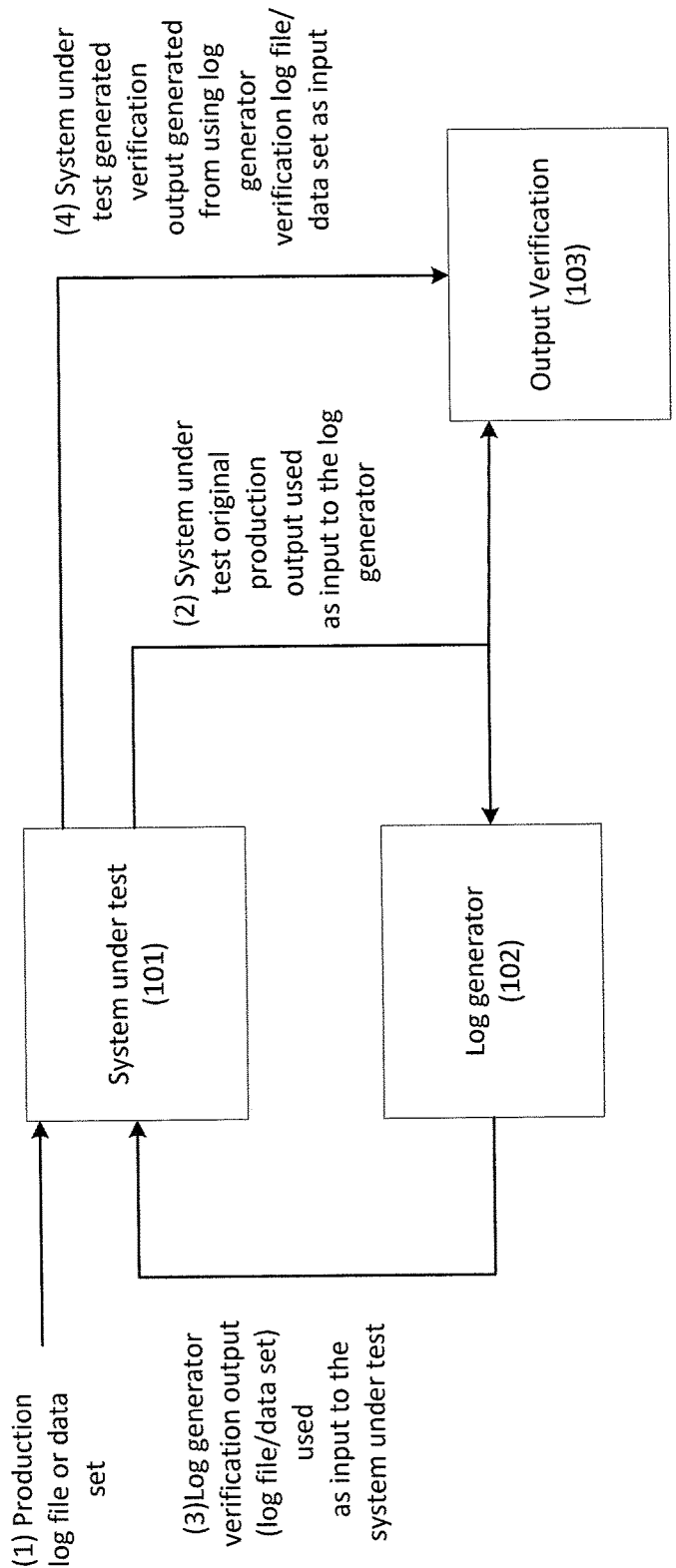
FIG. 1 is a block diagram illustrating an example process for verifying output of a system under test.

According to an exemplary embodiment, there may be a method that takes a description of the expected output of a system under test as input and generates output that, when ingested by the system under test, produces output that matches the description of the expected output. FIG. 1 illustrates an exemplary embodiment. A system under test (101) may produce original output (referred to as production output) an example of which is shown in FIG. 2, when a production log file or data set is provided to the system. Although the input and output are referred to as production input/output, the input/output can come from any system in development, test, or production while running normally. The term "production" refers to the fact that the system is in a production-like or production-ready state.

A description of expected output of a system may include aggregated data of metrics generated from log files produced by running an application and/or displaying content to users. An exemplary log generator process (102) may be written to take in production output, or a description of production output, of a system under test. A description of the production output maybe just a simplification of the real production output. The term "production output" refers to either the production output itself or the simplified description of the production output. The log generator may understand how to process production output (or the description of the production output) from the system under test and recreate a data set, or log file, that can be used by the system under test to produce the production output. This data set or log file may be referred to as a verification data set or log file because it may be used to verify the output of a system under test.

A generic verification log file may specify field names, values, and frequency of occurrence as partially illustrated in FIG. 3. Dozens of statistics may be collected, some of which can take arbitrary values. For example, gender may be a specified field and a generic verification log file may be created to include several log entries that identify users' genders. Then, the verification log file may be provided to the system under test (101) and generated verification output may be produced. Generated verification output may be similar to the production output (or simplified production output) and include metrics and statistical analysis regarding the verification log file based on processing from a system under test. This output may be referred to as verification output since it is generated by the system under test when the system has received verification log files or data sets as input.

Both the production output (or simplified version) from the system and the generated verification output from the system may be provided to an output verification process (103) which determines whether there are inconsistencies between the two outputs produced by the system under test (101). For example, a test input may specify 40% male impressions and produce output to match. This output may then be run through a production system. If the production system reports any percentage for male impressions other than 40%, an example system may identify a bug. Data inconsistencies may be determined by comparing a production output (or simplified description) with a verification output. Comparisons may include comparing like terms and/.or metrics.

In order to be able to change original production output (or simplified description) into verification log files or data sets, an example log generator process (102) may require code or a template that instructs the log generator process (102) in converting from the provided production output (or simplified description) to a verification data set.

For example, the original production output of a system may specify that a number of browser cookies that has been aggregated by the system. The original production output may also specify attributes associated with the browser cookies as well as values for each attribute. Code may be written or a template provided that instructs for each attribute, for each value, the value to be assigned to a value frequency multiplied by the number of browser cookies.

For example, if there are five (5) total browser cookies specified in the production output and forty (40) percent of them should be male, a log generator process may include instructions to create as many browser cookies as the total specified in the production output and a percentage of the browser cookies with specific attributes should match the percentages identified in the production output. In this case, a log generator process may create two browser cookies with male attributes to match the forty percent male browser cookies specified in the production output. If an output file specifies both people and impression data, browser cookies should be created for the specified people with specified impression data. An example system may calculate the weight distribution necessary to obtain the input-specified total browser cookie weight and input specific total people weight. For each browser cookie, an arbitrary number of impressions may be generated so that each browser cookie has at least one impression for each mutable value and the total number of impressions matches the production output. For example, if the production output has a cookie associated with 3 different sites, there should be 3 different impressions in the log generated by the log generator process.

In some embodiments, one generic log generator process (102) may be able to convert production output (or simplified description) from multiple systems into verification input for these respective systems. A generic log generator process may include functionality such as the ability to iterate through multiple aggregated trait assignments and parse traits and attributes from the trait assignments to create log entries, or data set entries. In other embodiments, a log generator process may be written for each system under test (101), each process may take in system-specific production output (or simplified description) as input and produce verification logs and/or data sets that may be inputted into a specific system to produce verification output. A log generator process may be specifically implemented for systems such as: a system collecting advertisement impressions, a social network calculating usage and viewing statistics, an online store tracking purchases, a website monitoring traffic, sales software monitoring salesperson success, and scientific software monitoring experiment outcomes.

For example, there may be a system that takes event logs which are views of advertisements known as ad impressions and creates aggregate metrics across specified segments of user demographics. Event logs may contain a number of raw ad impressions. These ad impressions may include data such as country, region, city, browser, age bucket, gender, site, campaign, and advertiser. Given a data set or log files of impressions, a system may produce certain output in the form of metrics. The system may create metrics such as the total number of impressions and the total number of unique cookie IDs along specified dimensions, or segments, such as gender or age based on the ad impressions provided in the event logs. Several metrics may require that the system determines if it has seen a particular cookie before in a specified segment. Errors in counting impressions could lead to improperly throwing away valid impressions or double counting impressions.

A system may, for example, verify that a given browser cookie only counts towards one segment for fixed attributes such as gender. A browser cookie with a female attribute should not be counted in the browser cookie count when the browser cookie's should be associated with males. Attributes such as the site which a browser cookie is associated vary over the lifetime of a browser cookie so the browser cookie may be associated with more than one segment of sites. For example, if a browser cookies visits two different sites, the browser cookie should be counted in both sites' segments.

To verify the correctness of the way the system aggregates metrics and to test the system in general, there may be a log generator process that takes the system production output (or simplified description) as input and creates verification logs or data sets from the metrics. An example log generator may create verification event logs that match a given total segment on raw impressions and the total number of unique cookie IDs that a system under test produced as production output. Verification logs and/or data sets may be built in stages. For example, an example log generator may create a pool of cookie objects, each with a unique id. Each cookie may be assigned a gender in proportion to the specified input. Other static values like age may be applied to the set of all cookies or a subset of the cookies. From each browser cookie, impressions may be generated using the data specified in the cookie. A cookie generator object may contain attributes about a browser cookie. Each attribute may be immutable (like age) or mutable (like site to visit). An example log generator may set the mutable attributes. Then impressions may be generated from the cookie generator object. There may be mandatory impressions that are the minimum set of impressions necessary to fulfill the rotating trait values assigned to a browser cookie. For example, a browser cookie may be set to have a female attribute. Additionally, the browser cookie may be set to visit sites A, B, and C. The mandatory impression count may be three. If another browser cookie is set to visit sites A, B, and C, and campaigns Q and R, the mandatory impressions count is also three. There may also be arbitrary impressions which may be generated by an arbitrary impressions generation function. When an arbitrary impressions generation function is executed, attribute values of impressions are not guaranteed to rotate. For example, an arbitrary impression generation function may produce five female if asked for five impressions. However, these impressions may have no site, all be at site B, or rotate through sites A, B, and C.

All mandatory impressions may be generated against all cookies. If the impressions generated are less than the total required number of impressions, an example generation process may then generate arbitrary impressions to fill in the gap of impressions between required impressions and total impressions.

The generated verification log file or data set may then be provided to the system under test. The system may use the verification file or data set to generate verification output such as aggregated data. The generated verification output produced by the system using the generated verification log file as input may be compared with the original production output to determine inconsistencies using an output verification process. An example process may compare the original production output with the generated verification output on specified metrics, comparing information such as totals and frequencies of data in order to verify that the generated verification output contains the same amount of metrics with the same attributes as the original production output.

Figure 4:
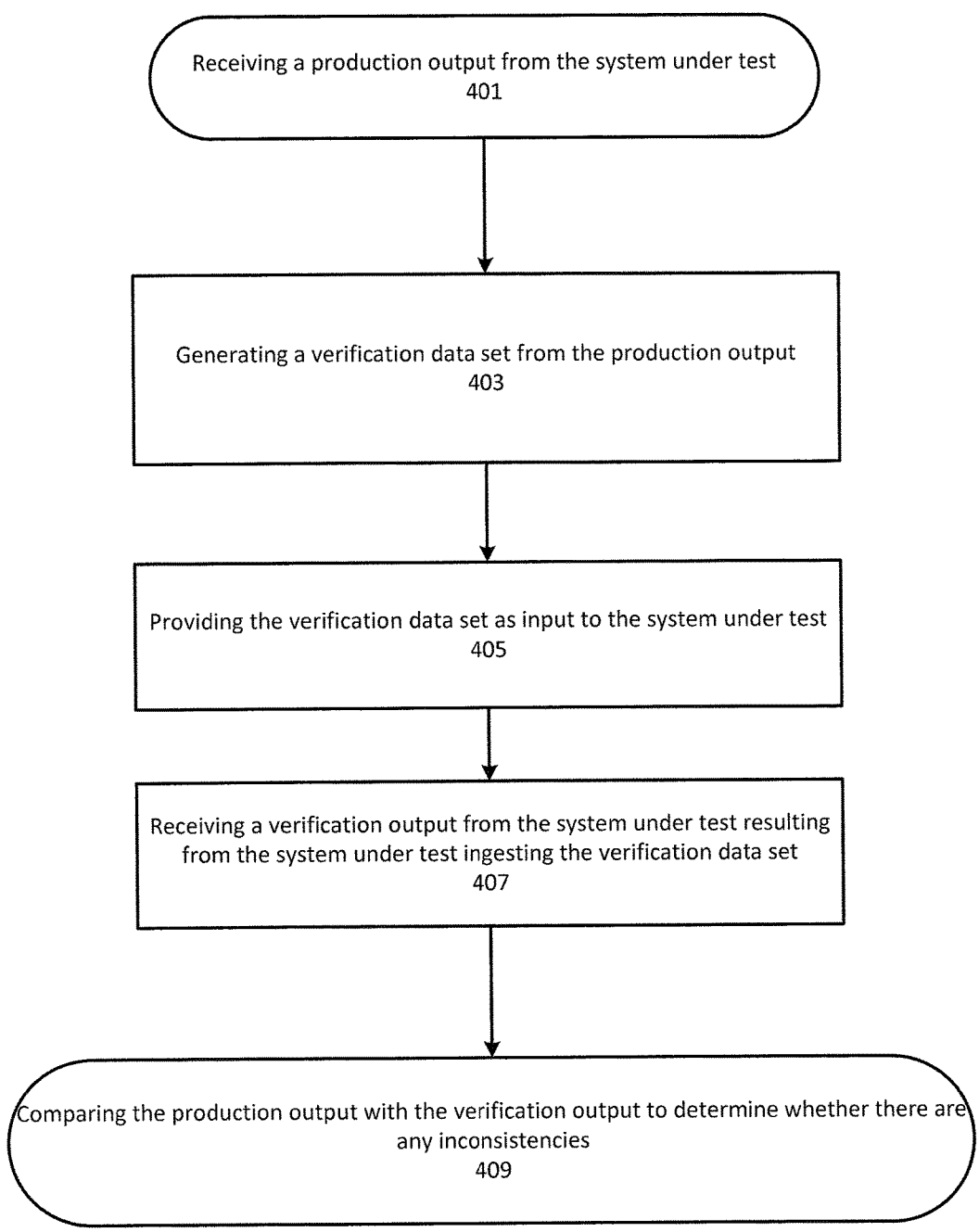
FIG. 4 is a flow diagram of an example method for verifying output of a system under test.

An example method begins with receiving a production output from a system under test as illustrated in FIG. 4 (401). A verification data set (or log file) may be generated from the production output (403). Then the verification data set (or log file) may be provided as input to the system under test (405). A verification output may be received from the system under test, the verification output resulting from the system under test ingesting the provided verification data set (or log file) (407). The production output and the verification output may be compared with each other to determine whether there are any inconsistencies (409).

In some embodiments, the original production output of a system under test may be a summary of data including aggregated data. FIG. 2 shows a summary of the raw impressions which include fifteen raw impressions of cookies. A user may be able to define the summary of the data. A log generator process may create verification logs or data sets that match the summary. There may be multiple ways to summarize data including creating aggregated metrics.

However, output which is a summary of data such as aggregated data may not provide enough information to recreate the original data set, or log files, that were used to generate the original data output. Therefore, an exemplary method may only be able to recreate a data set and not the actual original data set that was used to generate the aggregated data. For most systems and test cases, this recreated data set may be used to verify output. However, other systems and test cases may require specific log data for testing purposes. This specific data may be created manually or through specifying data to a data generation tool.

In some embodiments, a system under test may need more than a generated verification log file and/or data set to create generated output. For example, a system under test may need both verification event logs and a table of data in order to properly calculate metric weights. An example log generator may then generate both verification log files and either the necessary additional files or something sufficient to generate the additional files. The location of additional files may be hard-coded into an example log generator, provided by configuration file, or provided by some other mechanism for specifying dependent files.

Figure 5:
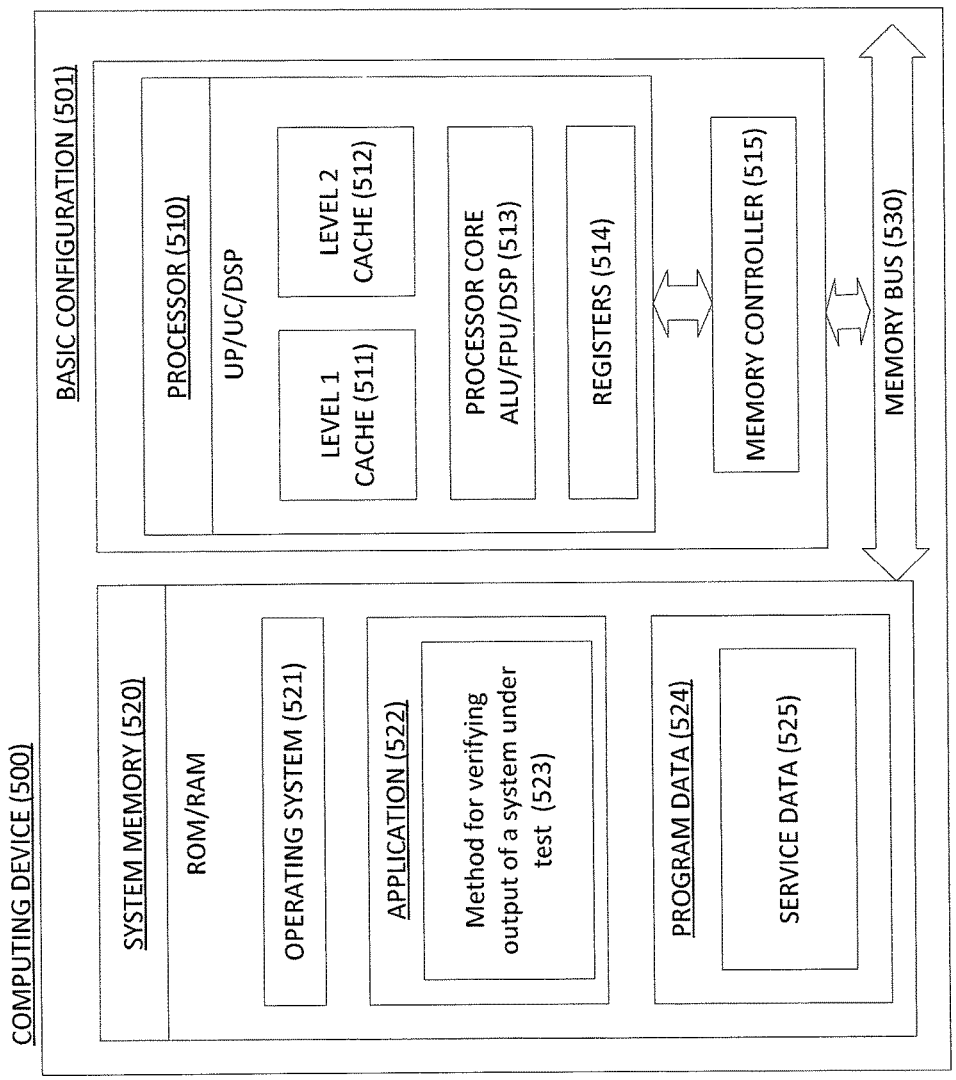
FIG. 5 is a block diagram illustrating an exemplary computing device.

FIG. 5 is a high-level block diagram of an exemplary computer (500) that is arranged for verifying output of a system under test. In a very basic configuration (501), the computing device (500) typically includes one or more processors (510) and system memory (520). A memory bus (530) can be used for communicating between the processor (510) and the system memory (520).

Depending on the desired configuration, the processor (510) can be of any type including but not limited to a microprocessor (µP), a microcontroller (µC), a digital signal processor (DSP), or any combination thereof. The processor (510) can include one more levels of caching, such as a level one cache (511) and a level two cache (512), a processor core (513), and registers (514). The processor core (513) can include an arithmetic logic unit (ALU), a floating point unit (FPU), a digital signal processing core (DSP Core), or any combination thereof. A memory controller (516) can also be used with the processor (510), or in some implementations the memory controller (515) can be an internal part of the processor (510).

Depending on the desired configuration, the system memory (520) can be of any type including but not limited to volatile memory (such as RAM), non-volatile memory (such as ROM, flash memory, etc.) or any combination thereof. System memory (520) typically includes an operating system (521), one or more applications (522), and program data (524). The application (522) may include a system for verifying output of a system under test. Program Data (524) includes storing instructions that, when executed by the one or more processing devices, implement a system and method for verifying output of a system under test. (523). In some embodiments, the application (522) can be arranged to operate with program data (524) on an operating system (521).

The computing device (500) can have additional features or functionality, and additional interfaces to facilitate communications between the basic configuration (501) and any required devices and interfaces.

System memory (520) is an example of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such computer storage media can be part of the device (500).

The computing device (500) can be implemented as a portion of a small-form factor portable (or mobile) electronic device such as a cell phone, a smart phone, a personal data assistant (PDA), a personal media player device, a tablet computer (tablet), a wireless web-watch device, a personal headset device, an application-specific device, or a hybrid device that include any of the above functions. The computing device (500) can also be implemented as a personal computer including both laptop computer and non-laptop computer configurations.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of non-transitory signal bearing medium used to actually carry out the distribution. Examples of a non-transitory signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium. (e.g., a fiber optic cable, a waveguide, a wired communications link, a wireless communication link, etc.)

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method for verifying output of a system under test, the method comprising:
receiving a production output from the system under test;
generating a verification data set from the production output;
providing the verification data set as input to the system under test;
receiving a verification output from the system under test resulting from the system under test ingesting the verification data set; and
comparing the production output with the verification output to determine whether there are any inconsistencies, wherein the production output and the verification output include aggregated metrics.

2. The computer-implemented method of claim 1, wherein the verification data set is in the form of a log file.

3. The computer-implemented method of claim 1, further comprising providing information to the system under test in addition to the verification data set for the system under test to produce the verification output.

4. The computer-implemented method of claim 3, wherein the provided information includes an additional file.

5. The computer-implemented method of claim 3, wherein the provided information includes information sufficient to generate an additional file.

6. The computer-implemented method of claim 1, wherein the system under test is a system for collecting advertisement impressions, a social network system that calculates usage and viewing statistics, an online store system that tracks purchases, a website application that monitors traffic, a sales software system monitoring salesperson success, or a scientific software system that monitors experiment outcomes.

7. The computer-implemented method of claim 1, wherein generating a verification data set includes receiving software code or a template that provides information for converting the production output into a verification data set.

8. The computer-implemented method of claim 1, wherein generating a verification data set includes iterating through multiple aggregated trait assignments and parsing traits and attributes from the trait assignments to create verification data set entries.

9. A system for verifying the output of a system under test, the system comprising:
one or more processing devices and
one or more storage devices storing instructions that, when executed by the one or more processing devices, cause the one or more processing devices to:
receive a production output from the system under test;
generate a verification data set from the production output;
provide the verification data set as input to the system under test;
receive a verification output from the system under test resulting from the system under test ingesting the verification data set; and
compare the production output with the verification output to determine whether there are any inconsistencies,
wherein the production output and the verification output include aggregated metrics.

10. The system of claim 9, wherein the verification data set is in the form of a log file.

11. The system of claim 9, further comprising providing information to the system under test in addition to the verification data set from the system under test to produce the verification output.

12. The system of claim 11, wherein the provided information includes an additional file.

13. The system of claim 11, wherein the provided information includes information sufficient to generate an additional file.

14. The system of claim 9, wherein the system under test is a system for collecting advertisement impressions, a social network that calculates usage and viewing statistics, an online store system that tracks purchases, a website application that monitors traffic, a sales software system monitoring salesperson success, or a scientific software system that monitors experiment outcomes.

15. The system of claim 9, wherein generating a verification data set includes receiving software code or a template that provides information about converting the production output into a verification data set.

16. The system of claim 9, wherein generating a verification data set includes iterating through multiple aggregated trait assignments and parsing traits and attributes from the trait assignments to create verification data set entries.

\* \* \* \* \*